(12) United States Patent　　　(10) Patent No.: US 12,701,029 B2
Ushiro　　　　　　　　　　　　　(45) Date of Patent: Aug. 4, 2026

(54) ON-BOARD APPARATUS, ON-BOARD SYSTEM, CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 18/853,765

(22) PCT Filed: Mar. 22, 2023

(86) PCT No.: PCT/JP2023/011310
§ 371 (c)(1),
(2) Date: Oct. 3, 2024

(87) PCT Pub. No.: WO2023/195342
PCT Pub. Date: Oct. 12, 2023

(65) Prior Publication Data
US 2025/0233770 A1　　Jul. 17, 2025

(30) Foreign Application Priority Data
Apr. 4, 2022　(JP) ................................. 2022-062308

(51) Int. Cl.
*H04L 12/40*　　　(2006.01)

(52) U.S. Cl.
CPC .................. *H04L 12/40039* (2013.01); *H04L 2012/40273* (2013.01)

(58) Field of Classification Search
None
See application file for complete search history.

(56) References Cited

U.S. PATENT DOCUMENTS

| 6,484,082 B1 * | 11/2002 | Millsap | ............... H04L 12/4035 |
| | | | 701/32.7 |
| 2007/0230484 A1 * | 10/2007 | Hu | ........................... H04L 12/66 |
| | | | 370/392 |

(Continued)

FOREIGN PATENT DOCUMENTS

| JP | 2017-126828 A | 7/2017 |

OTHER PUBLICATIONS

International Search Report, Application No. PCT/JP2023/011310, mailed Jun. 6, 2023. ISA/Japan Patent Office.

*Primary Examiner* — Kim Huynh
(74) *Attorney, Agent, or Firm* — Brooks Kushman P.C.

(57) ABSTRACT

An on-board apparatus is connected to a plurality of ECUs which include: a first ECU; and a second ECU. The first ECU includes: a first transceiver which, upon receiving a control message corresponding to a matching pattern recorded in a register of the first transceiver, switching the first ECU to a normal mode from a sleep mode, and a second transceiver switching the first ECU from the sleep mode to the normal mode upon receiving a predetermined activation signal. The on-board apparatus includes: a storage unit that stores therein a wake-up pattern for switching the first ECU from the sleep mode to the normal mode; and a control unit that transmits the activation signal if a first activation notification indicating that the first ECU has switched to the normal mode is not received within a predetermined amount (Continued)

of time after receiving a control message corresponding to the wake-up pattern.

15 Claims, 10 Drawing Sheets

(56) References Cited

U.S. PATENT DOCUMENTS

| 2013/0326255 | A1 | 12/2013 | Kodama et al. | |
|---|---|---|---|---|
| 2014/0229753 | A1 | 8/2014 | Itou | |
| 2021/0258186 | A1 | 8/2021 | Tokunaga et al. | |
| 2022/0001835 | A1* | 1/2022 | Kim | B60R 25/00 |
| 2023/0089480 | A1* | 3/2023 | Tani | B60R 16/023 |
| | | | | 701/36 |

\* cited by examiner

ON-BOARD APPARATUS, ON-BOARD SYSTEM, CONTROL METHOD, AND COMPUTER PROGRAM

CROSS-REFERENCE TO RELATED APPLICATIONS

This application is the U.S. national stage of PCT/JP2023/011310 filed on Mar. 22, 2023, which claims priority of Japanese Patent Application No. JP 2022-062308 filed on Apr. 4, 2022, the contents of which are incorporated herein.

TECHNICAL FIELD

The present disclosure relates to an on-board apparatus, an on-board system, a control method, and a computer program.

BACKGROUND

There are known on-board networks in which a plurality of Electronic Control Units (ECUs) are connected. With the increase in the number of ECUs installed in vehicles, recent years have seen a development in the partial network function for waking up only some ECUs to be used for control and putting the rest of the ECUs to sleep in order to suppress power consumption in the entire system.

JP 2021-129245A discloses a technique in which a plurality of ECUs connected to a communication bus wake up based on activation information included in a communication frame transmitted on the communication bus. Each ECU in JP 2021-129245A includes a transceiver that includes a register in which an activation condition of the ECU is stored. Furthermore, a logical AND of the activation condition of the register and the activation information included in the communication frame is calculated bit by bit, and the ECU wakes up if the result of the logical AND is true in at least one bit.

There are cases in which an activation condition stored in a register is overwritten due to some abnormality (e.g., noise). In the technique according to JP 2021-129245A, an ECU is woken up based on a logical AND of activation information included in a communication frame and an activation condition stored in a register; thus, if the activation condition is overwritten, the ECU, which is supposed to wake up, may not wake up due to the logical AND yielding a false result.

In view of this problem, one aim of the present disclosure is to provide an on-board apparatus, an on-board system, a control method, and a computer program that can wake up an ECU supporting the partial network function with greater certainty.

SUMMARY

An on-board apparatus according to the present disclosure is an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the on-board apparatus includes: a storage unit that stores therein a wake-up pattern for switching the first ECU from the sleep mode to the normal mode; and a control unit that transmits the activation signal to the first ECU via the communication bus, the second ECU, and the communication line if a first activation notification indicating that the first ECU has switched to the normal mode is not received within a predetermined amount of time after a control message corresponding to the wake-up pattern is received from the communication bus.

A control method according to the present disclosure is a control method for controlling an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the control method includes: a first step of receiving, from the communication bus, a control message corresponding to a wake-up pattern for switching the first ECU from the sleep mode to the normal mode; a second step of determining whether or not a first activation notification indicating that the first ECU has switched to the normal mode is received within a predetermined amount of time after the first step; and a third step of transmitting the activation signal to the first ECU via the communication bus, the second ECU, and the communication line if the first activation notification is not received in the second step.

A computer program according to the present disclosure is a computer program for controlling an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the computer program causes a computer to execute: a first step of receiving, from the communication bus, a control message corresponding to a wake-up pattern for switching the first ECU from the sleep mode to the normal mode; a second step of determining whether or not a first activation notification indicating that the first ECU has switched to the normal mode is received within a predetermined amount of time after the first step; and a third step of transmitting the activation signal to the first ECU via the communication bus, the second ECU, and the communication line if the first activation notification is not received in the second step.

Advantageous Effects

According to the present disclosure, an ECU supporting the partial network function can be woken up with greater certainty.

DETAILED DESCRIPTION OF PREFERRED EMBODIMENTS

Figure 1:
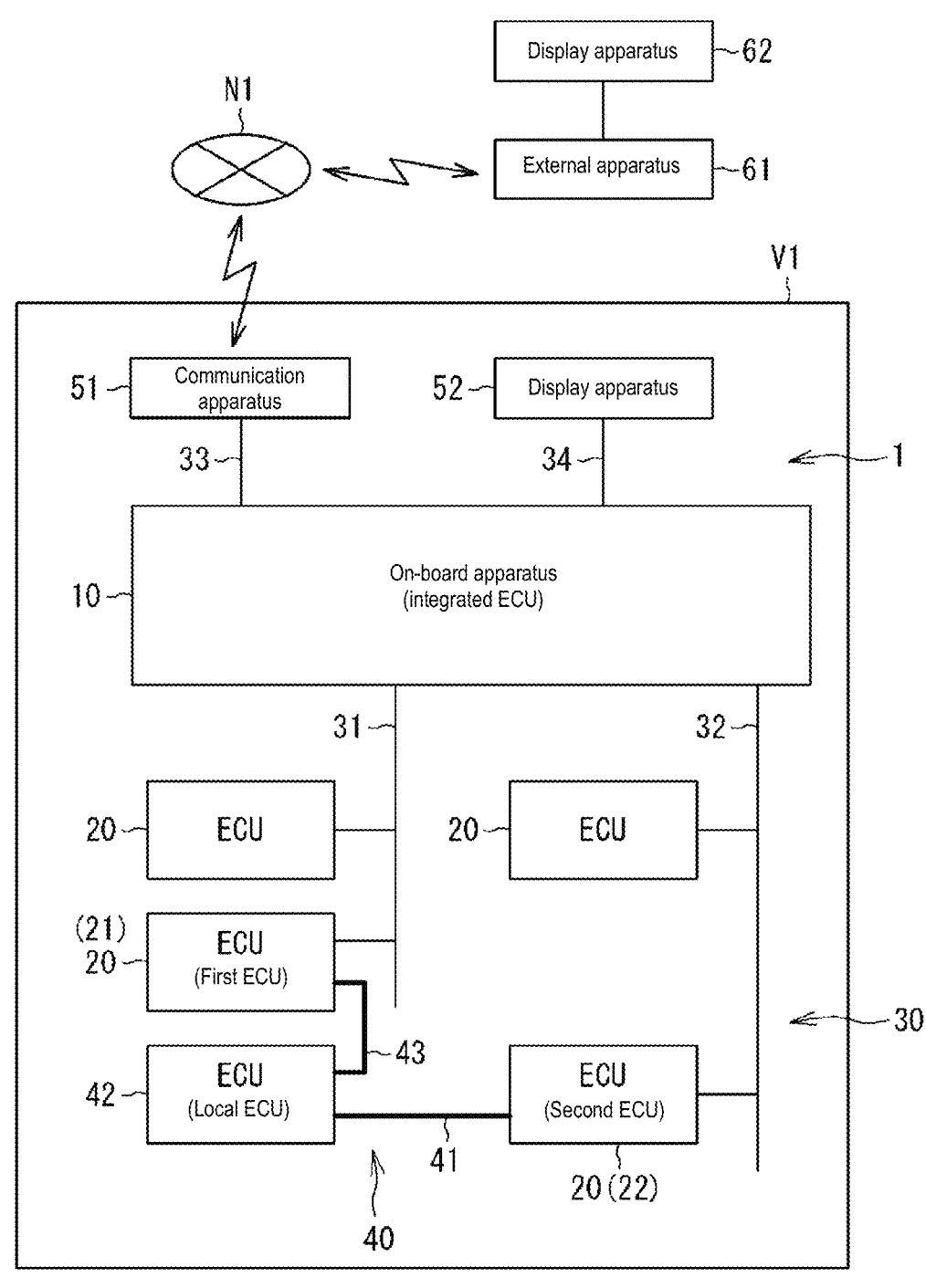
FIG. 1 is a diagram illustrating an example of an on-board system according to an embodiment.

Embodiments of the present disclosure include the following configurations as the gist thereof.

An on-board apparatus according to the present disclosure is an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the on-board apparatus includes: a storage unit that stores therein a wake-up pattern for switching the first ECU from the sleep mode to the normal mode; and a control unit that transmits the activation signal to the first ECU via the communication bus, the second ECU, and the communication line if a first activation notification indicating that the first ECU has switched to the normal mode is not received within a predetermined amount of time after a control message corresponding to the wake-up pattern is received from the communication bus.

If the first ECU does not wake up via the first transceiver, the on-board apparatus wakes up the first ECU from the second transceiver via the communication line. Thus, the first ECU supporting the partial network function can be woken up with greater certainty.

The on-board apparatus may be connected to a display apparatus via the communication bus or a network, and the control unit may transmit a predetermined message to the display apparatus when, in a case in which a new ECU has been added to the plurality of ECUs, the new ECU includes the first transceiver, and there is no route connecting the on-board apparatus and the new ECU via the communication line.

By adopting such a configuration, even if a human error occurs of forgetting to connect the new ECU and the communication line, a worker, etc., can be notified of the abnormality by transmitting the predetermined message to the display apparatus. Thus, the new ECU can be connected correctly with greater certainty.

The first ECU may be connected by multiple routes to the on-board apparatus via the communication line, and the control unit may transmit the activation signal to the first ECU using a route, among the multiple routes, that passes through the least number of ECUs.

The smaller the number of ECUs that a signal transmitted from the on-board apparatus passes through, the more quickly the signal would arrive at the first ECU. Thus, the first ECU can be switched to the normal mode more quickly.

(4) The first ECU may be connected by multiple routes to the on-board apparatus via the communication line, and the control unit may transmit the activation signal to the first ECU using a route, among the multiple routes, in which the least number of ECUs are to be switched to the normal mode by a predetermined control message that is broadcast on the communication bus in order to transmit the activation signal to the first ECU.

Thus, power consumption in the on-board system can be reduced because the number of ECUs that are unnecessarily woken upon when the first ECU is switched to the normal mode can be reduced.

The plurality of ECUs may further include a third ECU that is connected to the second ECU in parallel with the first ECU via the communication line, the third ECU may transmit a second activation notification to the on-board apparatus upon switching from the sleep mode to the normal mode by receiving the activation signal transmitted to the first ECU via the communication line, and, upon receiving the second activation notification, the control unit may transmit a sleep signal for switching the third ECU from the normal mode to the sleep mode.

By adopting such a configuration, power consumption in the on-board system can be reduced because the third ECU having woken up incidentally as a result of the control for waking up the first ECU can be returned to the sleep mode.

An on-board system according to the present disclosure is an on-board system including: the on-board apparatus according to any one of (1) to (5) above; and the plurality of ECUs including the first ECU and the second ECU.

When the wake-up pattern does not match the matching pattern in a case in which the first ECU has been switched to the normal mode by the activation signal, the first ECU may overwrite the matching pattern recorded in the register with a correct matching pattern matching the wake-up pattern.

The first ECU can be woken up with greater certainty because, by overwriting the register of the first ECU with the correct matching pattern, the first ECU can be woken up using the matching pattern after the overwriting.

Upon being switched to the normal mode by the activation signal, the first ECU may transmit pattern information including the matching pattern to the on-board apparatus via the communication bus, if the wake-up pattern stored in the storage unit does not match the matching pattern included in the pattern information, the control unit may transmit overwrite information including the correct matching pattern to the first ECU, and, upon receiving the overwrite information, the first ECU may overwrite the matching pattern recorded in the register with the correct matching pattern.

By adopting such a configuration, processing load in the first ECU can be reduced because processing such as the determination of whether or not the wake-up pattern matches the matching pattern can be executed by the on-board apparatus.

The activation signal may include the wake-up pattern, and, when the wake-up pattern included in the activation signal does not match the matching pattern recorded in the register in a case in which the first ECU has been switched to the normal mode by the activation signal, the first ECU may overwrite the matching pattern recorded in the register with the correct matching pattern.

By adopting such a configuration, processing load in on-board apparatus can be reduced because processing such as the determination of whether or not the wake-up pattern matches the matching pattern can be executed by the first ECU.

A control method according to the present disclosure is a control method for controlling an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the control method includes: a first step of receiving, from the communication bus, a control message corresponding to a wake-up pattern for switching the first ECU from the sleep mode to the normal mode; a second step of determining whether or not a first activation notification indicating that the first ECU has switched to the normal mode is received within a predetermined amount of time after the first step; and a third step of transmitting the activation signal to the first ECU via the communication bus, the second ECU, and the communication line if the first activation notification is not received in the second step.

If the first ECU does not wake up via the first transceiver, the on-board apparatus causes the first ECU to wake up from the second transceiver via the communication line. Thus, the first ECU supporting the partial network function can be woken up with greater certainty.

A computer program according to the present disclosure is a computer program for controlling an on-board apparatus that is connected to a plurality of ECUs via a communication bus, wherein the plurality of ECUs include: a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the computer program causes a computer to execute: a first step of receiving, from the communication bus, a control message corresponding to a wake-up pattern for switching the first ECU from the sleep mode to the normal mode; a second step of determining whether or not a first activation notification indicating that the first ECU has switched to the normal mode is received within a predetermined amount of time after the first step; and a third step of transmitting the activation signal to the first ECU via the communication bus, the second ECU, and the communication line if the first activation notification is not received in the second step.

If the first ECU does not wake up via the first transceiver, the on-board apparatus causes the first ECU to wake up from the second transceiver via the communication line. Thus, the first ECU supporting the partial network function can be woken up with greater certainty.

An embodiment of the present disclosure will be described in detail in the following with reference to the drawings.

Configuration of On-Board System

FIG. 1 is a diagram illustrating an example configuration of an on-board system 1 according to the embodiment.

The on-board system 1 is a system that is installed in a vehicle V1, which is an automobile or the like. The on-board system 1 includes an on-board apparatus 10, a plurality of ECUs 20, a communication bus 30, a communication line 40, a communication apparatus 51, and a display apparatus 52.

For example, the on-board apparatus 10 functions as an integrated Electronic Control Unit (ECU) that manages the plurality of ECUs 20. For example, the on-board apparatus 10 functions as a master ECU, and the plurality of ECUs 20 each function as a slave ECU. For example, the on-board apparatus 10 may distribute, to the plurality of ECUs 20, update data that is downloaded from an external apparatus 61 outside the vehicle V1 that is connected to the on-board apparatus 10 via a network N1.

The on-board apparatus 10 may function as a Gateway-ECU (GW-ECU) that relays data transmitted and received among the plurality of ECUs 20. For example, in a network environment in which a plurality of different local area networks (LANs) are present in the vehicle V1, the on-board apparatus 10 may relay data transmitted and received by a plurality of ECUs 20 present in the respective LANs; that is, specifically, the on-board apparatus 10 may be a Central Gateway (CGW). The internal configuration of the on-board apparatus 10 will be described later.

For example, the communication apparatus 51 is a communication interface that wirelessly communicates with the external apparatus 61 via the network N1, which is the Internet or the like. Specifically, the communication apparatus 51 is a Telematics Communication Unit (TCU). The communication apparatus 51 transmits, to the external apparatus 61 via the network N1, data that is output from the on-board apparatus 10 via the communication bus 30 (specifically, a communication bus 33). Furthermore, the communication apparatus 51 inputs, to the on-board apparatus 10 via the communication bus 30, data (update data, etc.) that is transmitted from the external apparatus 61 via the network N1.

For example, the display apparatus 52 includes a display and a speaker. For example, the display apparatus 52 is provided in an on-board navigation apparatus. The display apparatus 52 displays various types of information to the interior of the vehicle V1 based on data that is output from the on-board apparatus 10 via the communication bus 30 (specifically, a communication bus 34).

The external apparatus 61 is an apparatus that is installed outside the vehicle V1. For example, the external apparatus 61 is a server that includes a control unit, a storage unit, and a communication unit. For example, the storage unit of the external apparatus 61 stores therein a program or data for controlling each part (e.g., the on-board apparatus 10 or an ECU 20) of the on-board system 1. For example, the manufacturer of an ECU 20 corrects the program or data as necessary, and stores the corrected program or date in the storage unit of the external apparatus 61 as needed. The communication unit of the external apparatus 61 transmits the corrected program or data to the on-board apparatus 10 as update data.

A display apparatus 62 is connected to the external apparatus 61 via a wired or wireless connection. For example, the display apparatus 62 includes a display and a speaker. For example, the display apparatus 62 may be a display of a computer or tablet terminal that is owned by a company (vehicle inspection company, body repair company, dealer, or the like) that carries out the maintenance and inspection of the vehicle V1. The display apparatus 62 displays various types of information based on output from the external apparatus 61.

The communication bus 30 is a global bus that is connected to the on-board apparatus 10, and extends from the on-board apparatus 10. Various components (the ECUs 20, the communication apparatus 51, and the display apparatus 52) are bus-connected to the communication bus 30. Four communication buses 30 extend from the on-board apparatus 10 in the example in FIG. 1; however, the number of communication buses 30 is not particularly limited. The four communication buses 30 are distinguished from one another by being individually referred to as communication buses 31, 32, 33, and 34. For example, the communication bus 30 conforms to a communication protocol such as the controller area network (CAN), Ethernet (registered trademark), or FlexRay (registered trademark).

The on-board apparatus 10 is connected to the plurality of ECUs 20 (four ECUs 20 in the example in FIG. 1) via the communication bus 30. In the example in FIG. 1, the on-board apparatus 10 is connected to two ECUs 20 via the communication bus 31, and is connected to two ECUs 20 via the communication bus 32.

The number of ECUs 20 included in the on-board system 1 is not particularly limited, as long as two or more ECUs 20 are included. For example, the ECUs 20 are apparatuses (operation-system ECUs) that control parts (e.g., the braking system, the doors, the battery, the air conditioner, etc.) of the vehicle V1. The functions of the ECUs 20 are not particularly limited, and the ECUs 20 may be apparatuses (cognitive-system ECUs) that monitor the states of parts of the vehicle V1 by communicating with sensors. The plurality of ECUs 20 may each have a different function or may have the same function.

The plurality of ECUs 20 include a first ECU 21 and a second ECU 22. The first ECU 21 is an ECU that supports the partial network function. In the example in FIG. 1, the ECU 20 that is second from the top among the ECUs 20 connected to the communication bus 31 is the first ECU 21; however, the position of the communication bus 30 to which the first ECU 21 is connected is not particularly limited. The internal configuration of the first ECU 21 will be described later.

The second ECU 22 is an ECU that is connected to the on-board apparatus 10 via the communication bus 30 and that is also connected to the first ECU 21 via the communication line 40. The second ECU 22 according to the present embodiment supports the partial network function; however, the second ECU 22 need not support the partial network function. In the example in FIG. 1, the ECU 20 that is second from the top among the ECUs 20 connected to the communication bus 32 is the second ECU 22; however, the position of the communication bus 30 to which the second ECU 22 is connected is not particularly limited.

In the present embodiment, other ECUs 20 other than the first ECU 21 and the second ECU 22 among the plurality of ECUs 20 also support the partial network function; however, the other ECUs 20 need not support the partial network function. Furthermore, the other ECUs 20 need not be provided in the on-board system 1.

The communication line 40 is a communication route that is different from the communication bus 30. For example, the communication line 40 includes a first local bus 41, a local ECU 42, and a second local bus 43. The local ECU 42 is an ECU that is not connected to the communication bus 30. The first local bus 41 connects the second ECU 22 and the local ECU 42, and the second local bus 43 connects the local ECU 42 and the first ECU 21.

The communication protocol to which the first local bus 41 and the second local bus 43 conform may be the same as or different from the communication protocol to which the communication bus 30 conform. For example, in a case in which the communication buses 31 and 32 conform to CAN, the first local bus 41 and the second local bus 43 may conform to a different communication protocol such as the Local Interconnect Network (LIN) or Clock Extension Peripheral Interface (CXPI).

Internal Configuration of On-Board Apparatus 10

Figure 2:
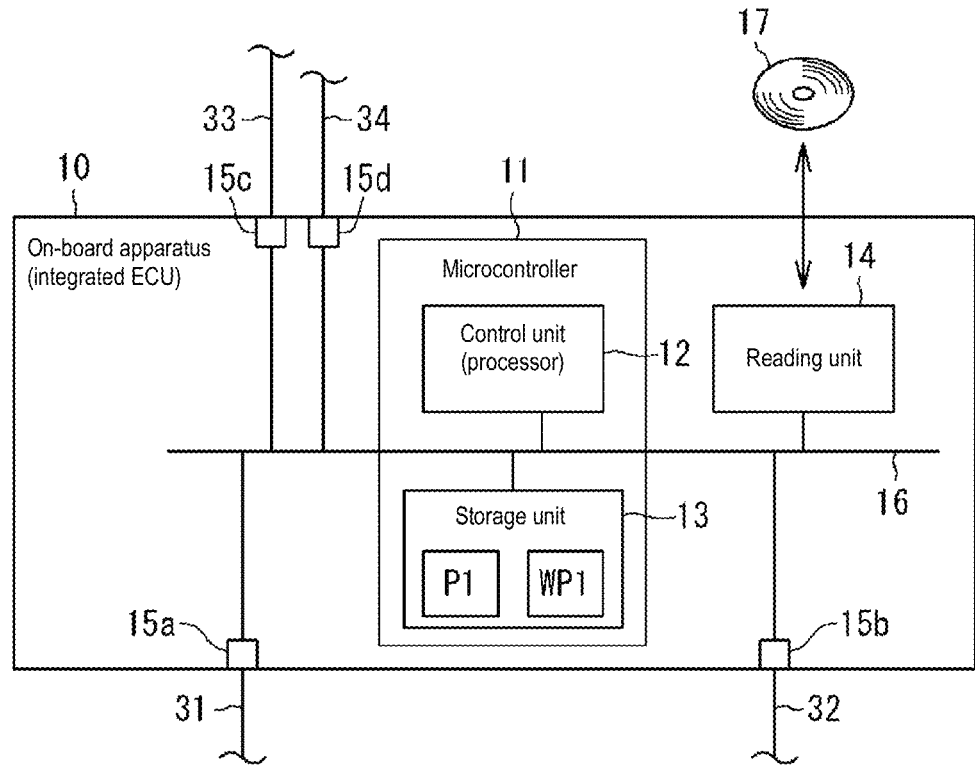
FIG. 2 is a diagram illustrating an example of an internal configuration of an on-board apparatus according to the embodiment.

FIG. 2 is a diagram illustrating an example of an internal configuration of the on-board apparatus 10.

The on-board apparatus 10 includes: a microcontroller unit 11 (hereinafter "microcontroller 11") that includes a control unit 12 and a storage unit 13; a reading unit 14; and a plurality of transceivers 15a to 15d. These units are electrically connected to one another via a bus 16.

For example, the control unit 12 includes circuitry such as a processor. Specifically, the control unit 12 includes one or more central processing units (CPUs). The processor included in the control unit 12 may be a graphics processing unit (GPU). In such cases, the control unit 12 executes various types of computation and control by reading out a computer program stored in the storage unit 13.

The control unit 12 may include a processor to which a predetermined program is written in advance. For example, the control unit 12 may be an integrated circuit such as a complex programmable logic device (CPLD), a field-programmable gate array (FPGA), or an application-specific integrated circuit (ASIC). In such a case, the control unit 12 executes various types of computation and control based on the program written thereto in advance.

The storage unit 13 includes a volatile memory and a non-volatile memory, and stores various types of data therein. For example, the volatile memory includes a random access memory (RAM). For example, the non-volatile memory includes a flash memory, a hard disk drive (HDD), a solid-state drive (SDD), a read-only memory (ROM), or the like. Part of the non-volatile memory may be provided outside the microcontroller 11.

For example, in the storage unit 13, a computer program P1, a wake-up pattern WP1, and various parameters are stored in the non-volatile memory. Note that the computer program P1, the wake-up pattern WP1, and the various parameters stored in the storage unit 13 may be downloaded from the external apparatus 61 via the network N1 and the communication apparatus 51. Here, the wake-up pattern WP1 is a signal pattern for waking up the first ECU 21. The wake-up pattern WP1 will be described later.

The reading unit 14 reads information from a computer-readable recording medium 17. For example, the recording medium 17 is a USB flash memory or an optical disc such as a CD or DVD. For example, the reading unit 14 is an optical drive or a USB terminal. The computer program P1, the wake-up pattern WP1, and the various parameters are recorded on the recording medium 17, and are stored in the non-volatile memory in the storage unit 13 by causing the reading unit 14 to read the recording medium 17.

The plurality of transceivers 15a to 15d each receive a signal transmitted on the communication bus 30 via a port (not illustrated in the drawings), and converts the received signal into a signal that can be read by the microcontroller 11. The transceiver 15a, the transceiver 15b, the transceiver 15c, and the transceiver 15d are respectively connected to the communication bus 31, the communication bus 32, the communication bus 33, and the communication bus 34.

Internal Configuration of ECUs 20

Figure 3:
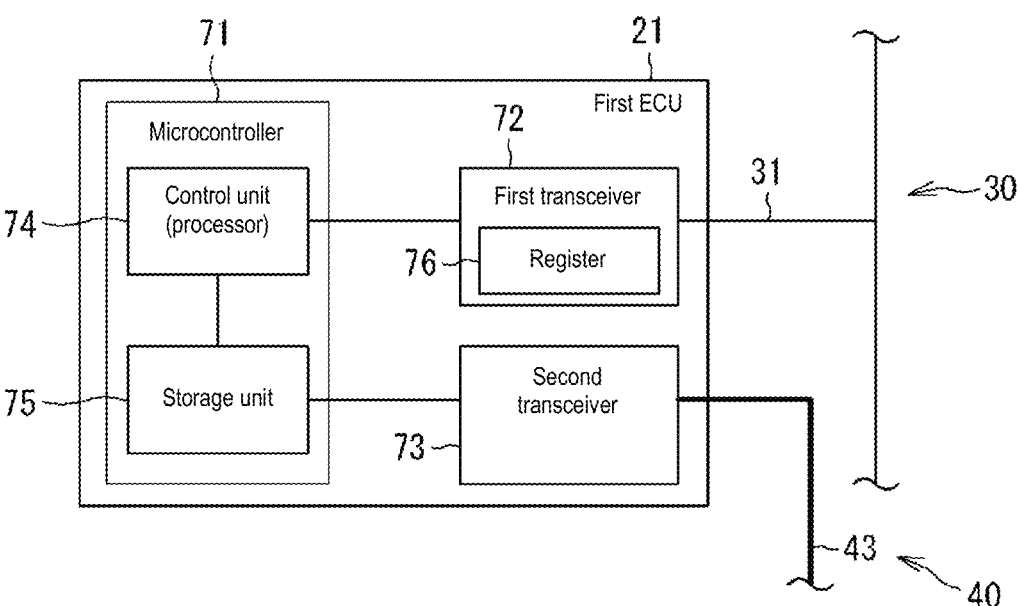
FIG. 3 is a diagram illustrating an example of an internal configuration of a first ECU according to the embodiment.

FIG. 3 is a diagram illustrating an example of an internal configuration of the first ECU 21. The internal configurations of the rest of the ECUs 20 are the same as the internal configuration of the first ECU 21, and description thereof is thus omitted.

The first ECU 21 includes: a microcontroller unit 71 (hereinafter "microcontroller 71") that includes a control unit 74 and a storage unit 75; a first transceiver 72; and a second transceiver 73. The first transceiver 72 and the second transceiver 73 are electrically connected to the microcontroller 71. The first ECU 21 further includes a power-supply circuit (not illustrated in the drawings) that converts electric power supplied from a power source (not illustrated in the drawings) and supplies the converted electric power to the units 71 to 73.

As is the case with the control unit 12, the control unit 74 includes circuitry such as a processor. For example, the control unit 74 executes various types of computation and control by reading out a computer program stored in the storage unit 75. Alternatively, as is the case with the control unit 12, the control unit 74 may include a processor to which a predetermined program is written in advance. In this case, the control unit 74 executes various types of computation and control based on the program written thereto in advance.

As is the case with the storage unit 13, the storage unit 75 includes a volatile memory and a non-volatile memory, and stores various types of data therein. For example, in the storage unit 75, the computer program and various parameters are stored in the non-volatile memory.

The first transceiver 72 is a transceiver that supports the partial network function, and includes an integrated circuit (IC). For example, the first transceiver 72 is a CAN transceiver or a system basis chip (SBC). The first transceiver 72 includes a register 76 in which a matching pattern MP1 is recorded. The matching pattern MP1 is pattern information that is used upon causing the first ECU 21 to transition from a sleep mode to a normal mode. The first transceiver 72 is connected to the communication bus 30 (specifically, the communication bus 31), and receives various control messages from the communication bus 30.

The first transceiver 72 includes a transmission circuit, a reception circuit, and a detection circuit (all of which are not illustrated in the drawings). The transmission circuit and the reception circuit perform communication in conformity with the same communication protocol as the communication bus 30. The transmission circuit converts digital-signal data output by the microcontroller 71 into a three-level analog signal, and transmits the analog signal onto the communication bus 30. The data converted into the analog signal is broadcast onto the communication bus 30. The reception circuit converts an analog signal input from the communication bus 30 into a digital signal that can be read by the microcontroller 71, and outputs the digital signal to the microcontroller 71.

The detection circuit has the function of determining whether or not a control message received from the communication bus 30 is a control message addressed to the first ECU 21 including the detection circuit. Furthermore, upon determining that the received control message is a control message addressed to the first ECU 21 including the detection circuit, the detection circuit switches the first ECU 21 including the detection circuit from the sleep mode to the normal mode.

Specifically, the first transceiver 72 switches the first ECU 21 from the sleep mode to the normal mode (i.e., wakes up the first ECU 21) upon receiving a control message that corresponds to the matching pattern MP1 recorded in the register 76. The wake-up of the first ECU 21 will be described later.

The second transceiver 73 is a transceiver that is connected to the communication line 40 (specifically, the second local bus 43), and includes an IC. Upon receiving a predetermined activation signal WS1 from the communication line 40, the second transceiver 73 switches the first ECU 21 from the sleep mode to the normal mode.

The second transceiver 73 may be a transceiver that supports the partial network function as does the first transceiver 72, or may be a receiver that does not support the partial network function. The second transceiver 73 may be a transistor (e.g., a field-effect transistor (FET)) that detects only the difference between the HIGH and LOW levels of a signal transmitted on the communication line 40.

Partial Networking in On-Board System 1

In the on-board system 1, in order to reduce the power consumption by the on-board system 1 as a whole, a network management function is used to wake up only some ECUs 20 to be used for control and continuously keep the rest of the ECUs 20 in the sleep mode. An ECU 20 can be switched between the normal mode and the sleep mode, and the switching between these modes is basically executed based on a control message (also referred to as a "communication frame") that is broadcast on the communication bus 30.

The normal mode is a mode in which the ECU 20 is woken up and functions of the ECU 20 necessary for various types of control are available for use. For example, the normal mode is a state in which a clock circuit of the processor included in the ECU 20 is operating at a predetermined clock frequency that is set in advance.

The sleep mode is a mode for reducing power consumption by limiting the functions of the ECU 20 compared to those in the normal mode. For example, the sleep mode is a state in which, as a result of the supply of electric power to the clock circuit of the processor included in the ECU 20 being stopped, the operations of the clock circuit and the processor are stopped. Note that the sleep mode may be a state in which, although electric power is being supplied to the clock circuit of the processor included in the ECU 20, power consumption is reduced by causing the clock circuit to operate at a clock frequency lower than that in the normal mode.

For example, the ECU 20 automatically switches from the normal mode to the sleep mode if a state in which the ECU 20 is not used continues for a predetermined amount of time or if the ECU 20 has executed predetermined control. Even while the ECU 20 is in the sleep mode, power supply from the power-supply circuit of the ECU 20 to the detection circuit of the first transceiver 72 and power supply from the power-supply circuit to the second transceiver 73 are continued. Thus, the first transceiver 72 can detect control messages and the second transceiver 73 can detect the activation signal WS1 in the sleep mode.

A control message for switching an ECU 20 from the sleep mode to the normal mode is generated by the on-board apparatus 10 or another ECU 20, for example, and broadcast onto the communication bus 30. The control message includes a wake-up pattern indicating the ECU 20 to which the control message is addressed. If the communication bus 30 is in conformity with CAN, the wake-up pattern is an 11-bit CAN-ID, for example. In the following, a pattern for waking up the first ECU 21, among wake-up patterns, is referred to, as necessary, as the "wake-up pattern WP1". Furthermore, a control message including the wake-up pattern WP1 is referred to, as necessary, as a "control message M1".

When the first transceiver 72 receives the control message M1 from the communication bus 31, in the first ECU 21 in the sleep mode, the first transceiver 72 compares the matching pattern MP1 stored in the register 76 and the wake-up pattern WP1 included in the control message M1. Specifically, the first transceiver 72 compares whether the matching pattern MP1 and the wake-up pattern WP1 match bit by bit, and, if all bits match (are true), the first transceiver 72 determines that the wake-up pattern WP1 matches the matching pattern MP1, and switches the first ECU 21 from the sleep mode to the normal mode.

For example, suppose that the matching pattern MP1 is an 11-bit pattern represented by "0x7**". The asterisks ("*") indicate that the values of the corresponding bits are not considered. That is, the matching pattern MP1 is a pattern for which a wake-up pattern in which the top three bits are "1" is true (i.e., the matching pattern MP1 is "111********"), irrespective of the values of the lower eight bits.

In this case, if a wake-up pattern included in a control message is a pattern of the 700 series, such as "0x700 (11100000000)" or "0x70F (11100001111)", for example, the wake-up pattern matches the matching pattern MP1 in every bit. In this case, the first transceiver 72 switches the first ECU 21 from the sleep mode to the normal mode.

On the other hand, if a wake-up pattern included in a control message is a pattern, such as "0x620 (01100100000)", other than that of the 700 series, the wake-up pattern does not match the matching pattern MP1 because the top three bits include a value other than "1". In this case, the first transceiver 72 does not switch the first ECU 21 from the sleep mode to the normal mode.

In such a manner, based on the matching pattern MP1 stored in the register 76, an ECU 20 can determine whether or not a control message received from the communication bus 30 is addressed to the ECU 20. Thus, the partial network function for waking up only some ECUs 20 to be used for control can be realized.

Problem to be Solved by Present Embodiment

There are cases in which the matching pattern MP1 stored in the register 76 is overwritten due to some abnormality (e.g., noise or unauthorized control). For example, if the matching pattern MP1, which is supposed to be "0x7", is overwritten with "0x6 (110******)" due to noise, etc., the wake-up pattern WP1, such as "0x700 (11100000000)", that is supposed to wake up the first ECU 21 would not match the matching pattern MP1. Due to this, the first transceiver 72 would not switch the first ECU 21** from the sleep mode to the normal mode even if the control message M1 is received.

In such a manner, if abnormal overwriting of the matching pattern MP1 stored in the register 76 occurs, the first ECU 21, which is supposed to wake up, may not wake up.

In view of this, in the present embodiment, if a notification (first activation notification X1) indicating that the first ECU 21 has woken up is not received within a predetermined amount of time after receiving the control message M1 (i.e., a message based on which the first ECU 21 is supposed to wake up) from the communication bus 30, the on-board apparatus 10 determines that some abnormality has occurred in the register 76 of the first ECU 21 and causes the first ECU 21 to wake up via a communication route (communication line 40) that is different from the communication bus 30. By adopting such a configuration, the first ECU 21 supporting the partial network function can be woken up with greater certainty.

In the following, the specific details of control in the on-board system 1 will be described while referring to FIGS. 1 to 4 as necessary.

Control Method

Figure 4:
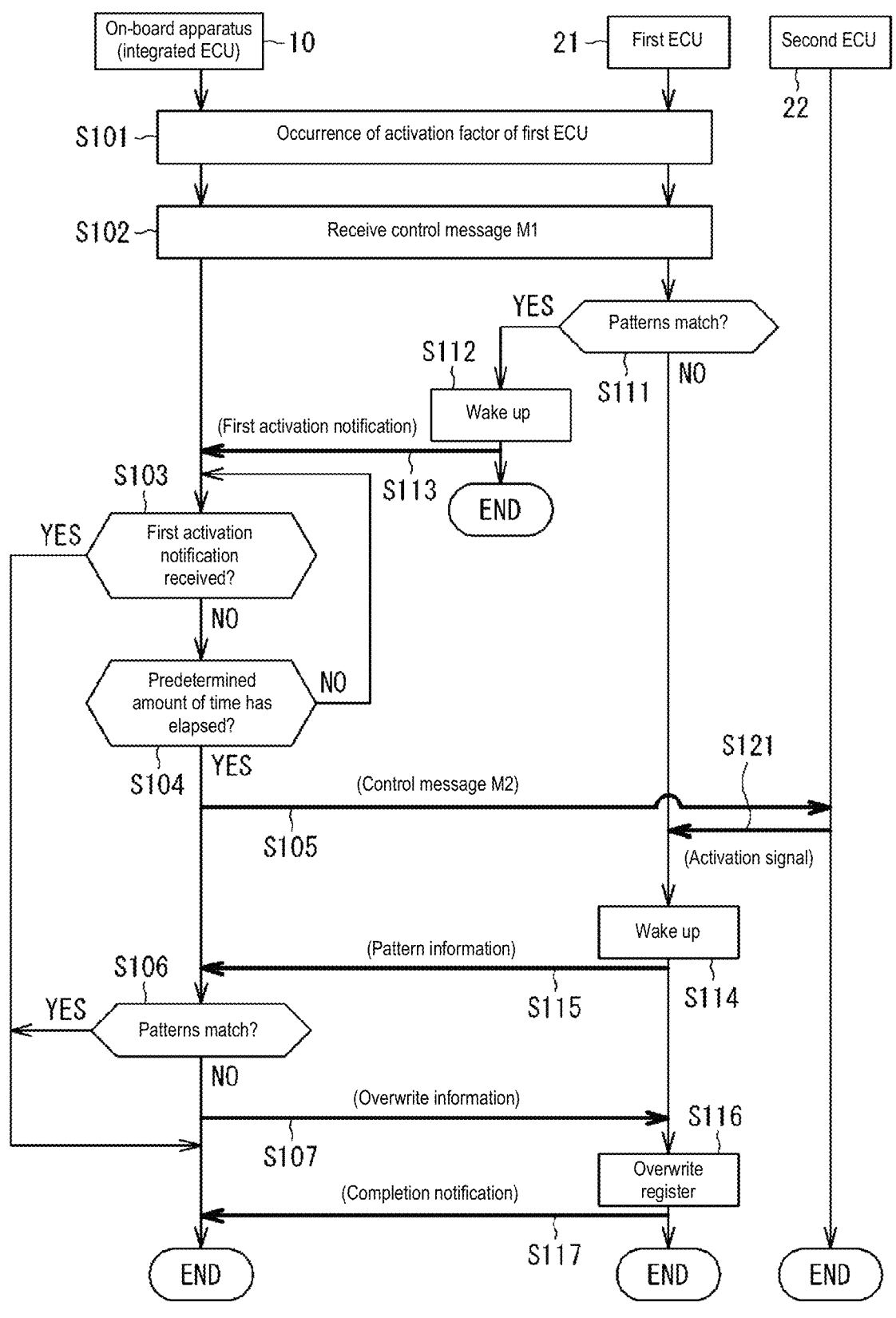
FIG. 4 is a flowchart illustrating an example of a control method according to the present embodiment.

FIG. 4 is a flowchart illustrating an example of a control method executed by the on-board system 1. Control executed by the on-board apparatus 10 is illustrated on the left side of FIG. 4, control executed by the first ECU 21 is illustrated in the middle of FIG. 4, and control executed by the second ECU 22 is illustrated on the right side of FIG. 4. The steps illustrated in FIG. 4 may be reordered, as necessary.

Control executed by the on-board apparatus 10 is executed by the microcontroller 11 or the transceivers 15a to 15d. When the microcontroller 11 executes control, the control unit 12 executes various types of computation and processing by reading the computer program P1 from the storage unit 13 (or in accordance with the program written to the control unit 12 in advance).

The control executed by the first ECU 21 is executed by the microcontroller 71, the first transceiver 72, or the second transceiver 73. When the microcontroller 71 executes control, the control unit 74 executes various types of computation and processing by reading the computer program from the storage unit 75 (or in accordance with the program written to the control unit 74 in advance).

First, an activation factor in response to which the first ECU 21 is to be woken up occurs (step S101). The activation factor of the first ECU 21 is not particularly limited, and is "the opening of a door of the vehicle V1," for example. Specifically, one of the ECUs 20 other than the first ECU 21 (e.g., the ECU 20 above the first ECU 21 in FIG. 1) is connected to a door sensor, and wakes up on its own based on a detection signal from the door sensor without waiting for a control message to be received. After waking up, the ECU 20 generates the control message M1 including the wake-up pattern WP1 and broadcasts the control message M1 onto the communication bus 30. This concludes step S101.

Next, the on-board apparatus 10 and the first ECU 21 receive the control message M1 from the communication bus 30 (step S102). After receiving the control message M1, the control unit 12 of the on-board apparatus 10 monitors whether or not the first activation notification X1 is received from the communication bus 30 (step S103). The first activation notification X1 is a notification indicating that the ECU 20 (i.e., the first ECU 21) corresponding to the wake-up pattern WP1 included in the control message M1 has switched to the normal mode.

Specifically, the storage unit 13 of the on-board apparatus 10 stores a plurality of wake-up patterns and ECUs 20 corresponding to the respective wake-up patterns in a state in which the wake-up patterns and the ECUs 20 are associated by means of a table, for example. Based on the table in the storage unit 13, the control unit 12 ascertains the ECU 20 (first ECU 21) associated with the wake-up pattern WP1 included in the received control message M1. Furthermore, in step S103, the control unit 12 monitors whether or not a notification indicating that the associated first ECU 21 has switched to the normal mode is received.

Upon receiving the first activation notification X1 (YES in step S103), the on-board apparatus 10 terminates control without executing subsequent steps S104 to S107. If the on-board apparatus 10 has not received the first activation notification X1 (NO in step S103), the control unit 12 repeats step S103 and monitors whether or not the first activation notification X1 is received until a predetermined amount of time elapses (step S104).

After receiving the control message M1, the first transceiver 72 of the first ECU 21 determines whether or not the wake-up pattern WP1 included in the control message M1 matches the matching pattern MP1 stored in the register 76 (step S111). Specifically, as described above, the first transceiver 72 compares the wake-up pattern WP1 and the matching pattern MP1 bit by bit as to determine whether or not the patterns match.

If the wake-up pattern WP1 matches the matching pattern MP1 (YES in step S111), the first transceiver 72 switches the first ECU 21 from the sleep mode to the normal mode (step S112). When the first ECU 21 has switched to the normal mode, the control unit 74 transmits the first activation notification X1 from the communication bus 30 to the on-board apparatus 10 (step S113), and terminates the sequence of control.

Here, a case will be considered in which the matching pattern MP1 in the register 76 has been overwritten with an incorrect matching pattern MPx due to an abnormality such as noise. The wake-up pattern WP1 is supposed to match the matching pattern MP1; however, there are cases in which the wake-up pattern WP1 does not match the matching pattern MPx due to abnormal overwriting in the register 76 (NO in step S111). In such a case, the first transceiver 72 does not switch the first ECU 21 to the normal mode, and the first ECU 21 is kept in the sleep mode. Furthermore, because the operation of the control unit 74 is in a stopped state, the first activation notification X1 is not transmitted.

If the first activation notification X1 is not received for the predetermined amount of time after receiving the control message M1 (YES in step S104), the on-board apparatus 10 transmits the activation signal WS1 to the first ECU 21 via the communication bus 30, the second ECU 22, and the communication line 40. Specifically, the control unit 12 transmits a control message M2 to the second ECU 22 via the communication bus 32 (step S105).

The control message M2 is a message including an instruction for causing the second ECU 22 to transmit the activation signal WS1 to the first ECU 21. For example, the control message M2 includes a wake-up pattern WP2 for waking up the second ECU 22, and the wake-up pattern WP1 for waking up the first ECU 21. For example, in the control message M2, the wake-up pattern WP1 is stored in a location other than that in which a wake-up pattern is normally stored (is stored in a data frame or the like).

Upon receiving the control message M2, the second ECU 22 switches from the sleep mode to the normal mode. Then, based on the instruction included in the control message M2, the second ECU 22 transmits the activation signal WS1 to the first ECU 21 via the communication line 40 (step S121).

Specifically, the activation signal WS1 is transmitted from the second ECU 22 onto the first local bus 41, and the local ECU 42 relays the activation signal WS1 as is to the second local bus 43 upon receiving the activation signal WS1. Then, the activation signal WS1 is input to the second transceiver 73 of the first ECU 21.

The activation signal WS1 is a signal for waking up the first ECU 21 via the second transceiver 73. In the present embodiment, as is the case with the control message M1, the activation signal WS1 is a control message including the wake-up pattern WP1.

Note that, as long as the activation signal WS1 is ultimately input to the second transceiver 73 of the first ECU 21, the details of the data transmitted between the components from the on-board apparatus 10 to the local ECU 42 are not limited to what is described above. For example, the activation signal WS1 may be transmitted from the on-board apparatus 10 to the second ECU 22, and the second ECU 22 may relay the received activation signal WS1 as is to the local ECU 42. Alternatively, a message that is different from the activation signal WS1 may be transmitted from the second ECU 22 to the local ECU 42, and the message may be converted into the activation signal WS1 by the local ECU 42.

Upon receiving the activation signal WS1, the second transceiver 73 of the first ECU 21 switches the first ECU 21 from the sleep mode to the normal mode (step S114). Specifically, after receiving the activation signal WS1, the second transceiver 73 determines whether or not the wake-up pattern WP1 included in the activation signal WS1 matches a matching pattern stored in a register (not illustrated in the drawings) of the second transceiver 73, and causes the first ECU 21 to wake up if the wake-up pattern WP1 matches the matching pattern.

Here, in a case in which the register 76 of the first transceiver 72 has been abnormally overwritten due to noise, etc., the risk is low of the register of the second transceiver 73 differing from the first transceiver 72 also being abnormally overwritten. That is, the risk is low of the register 76 of the first transceiver 72 and the register of the second transceiver 73 both being affected.

Thus, in the present embodiment, the on-board apparatus 10 causes the first ECU 21 to wake up by the second transceiver 73 via the communication line 40 if the first ECU 21 does not wake up by the first transceiver 72. Thus, the first ECU 21 supporting the partial network function can be woken up with greater certainty.

Note that, in a case in which the second transceiver 73 does not support the partial network function, the second transceiver 73 switches the first ECU 21 from the sleep mode to the normal mode when the activation signal WS1 is received as a trigger, irrespective of whether the wake-up pattern WP1 is included or not. In this case, the first ECU 21 can be woken up with greater certainty, even if there is a risk of the register of the second transceiver 73 being abnormally overwritten.

After waking up as a result of step S114, the first ECU 21 corrects the incorrect matching pattern MPx recorded in the register 76 to the correct matching pattern MP1. This correction control will be described in the following.

If the first ECU 21 has been woken up by the second transceiver 73, the control unit 74 reads out the matching pattern MPx stored in the register 76 of the first transceiver 72, and generates pattern information Y1 including the matching pattern MPx. Furthermore, the control unit 74 transmits the pattern information Y1 from the first transceiver 72 to the on-board apparatus 10 via the communication bus 31 (step S115).

When the on-board apparatus 10 receives the pattern information Y1 from the communication bus 31, the control unit 12 determines whether or not the wake-up pattern WP1 (the pattern based on which the first ECU 21 is supposed to wake up) stored in the storage unit 13 matches the matching pattern MPx included in the pattern information Y1 (step S106).

If the wake-up pattern WP1 matches the matching pattern MPx (YES in step S106), there is a possibility that the first ECU 21 did not wake up by the first transceiver 72 due to a factor other than the register 76 being overwritten. In this case, the control unit 12 skips later-described step S107 because the necessity of correcting the matching pattern MPx is low.

If the wake-up pattern WP1 does not match the matching pattern MPx (NO in step S106), it can be considered that the first ECU 21 did not wake up by the first transceiver 72 because the matching pattern MPx has an incorrect value due to the register 76 being overwritten. In this case, the control unit 12 generates a correct matching pattern (i.e., the matching pattern MP1) based on the wake-up pattern WP1, and transmits overwrite information Y2 including the matching pattern MP1 to the first ECU 21 via the communication bus 31 (step S107).

Specifically, the control unit 12 generates the matching pattern MP1 from the wake-up pattern WP1 using a mask pattern stored in the storage unit 13. The mask pattern is a pattern in which "1" is set to portions of the wake-up pattern WP1 that are to be preserved as the matching pattern MP1 (i.e., portions to which "*" indicating don't care bits are not to be set) and "0" is set to portions to be set as don't care bits.

For example, if the mask pattern is (11100000000), the top 3 bits are preserved as the matching pattern MP1, and the lower 8 bits are set as don't care bits. When the matching pattern MP1 is generated from the wake-up pattern WP1 (e.g., 11100000001) using such a mask pattern, the matching pattern MP1 (111********) is obtained.

Note that the method according to which the correct matching pattern MP1 is generated by the control unit 12 is not limited to this. For example, the matching pattern MP1 itself may be stored in the storage unit 13.

Upon receiving the overwrite information Y2, the first ECU 21 overwrites the matching pattern MPx recorded in the register 76 with the correct matching pattern MP1 (step S116). Thus, even if the matching pattern MP1 in the register 76 is overwritten with an incorrect matching pattern MPx due to noise, etc., the register 76 can be corrected based on the correct matching pattern MP1 stored in the on-board apparatus 10. Because the first ECU 21 can be woken up using the matching pattern MP1 after the correction, the first ECU 21 can be woken up with greater certainty.

After overwriting the register 76, the first ECU 21 transmits a completion notification Y3 to the on-board apparatus 10 via the communication bus 31 (step S117), and terminates the sequence of control. Upon receiving the completion notification Y3, the on-board apparatus 10 terminates the sequence of control. Note that, if the completion notification Y3 is not received even after a predetermined amount of time elapses after transmitting the overwrite information Y2 to the first ECU 21, the on-board apparatus 10 may retransmit the overwrite information Y2 to the first ECU 21.

Modifications

Modifications of the embodiment will be described in the following. In the modifications, the same reference symbols are given to configurations similar to those in the above-described embodiment, and description thereof is omitted.

Overwrite Determination by First-ECU-21 Side

In the example in FIG. 4, the on-board apparatus 10 determines whether or not the wake-up pattern WP1 matches the matching pattern MPx in step S106. That is, it is the on-board apparatus 10 that determines whether it is necessary or not to correct the matching pattern MPx in the register 76. Contrariwise, the first ECU 21 may determine whether it is necessary or not to correct the matching pattern MPx in the register 76.

Figure 5:
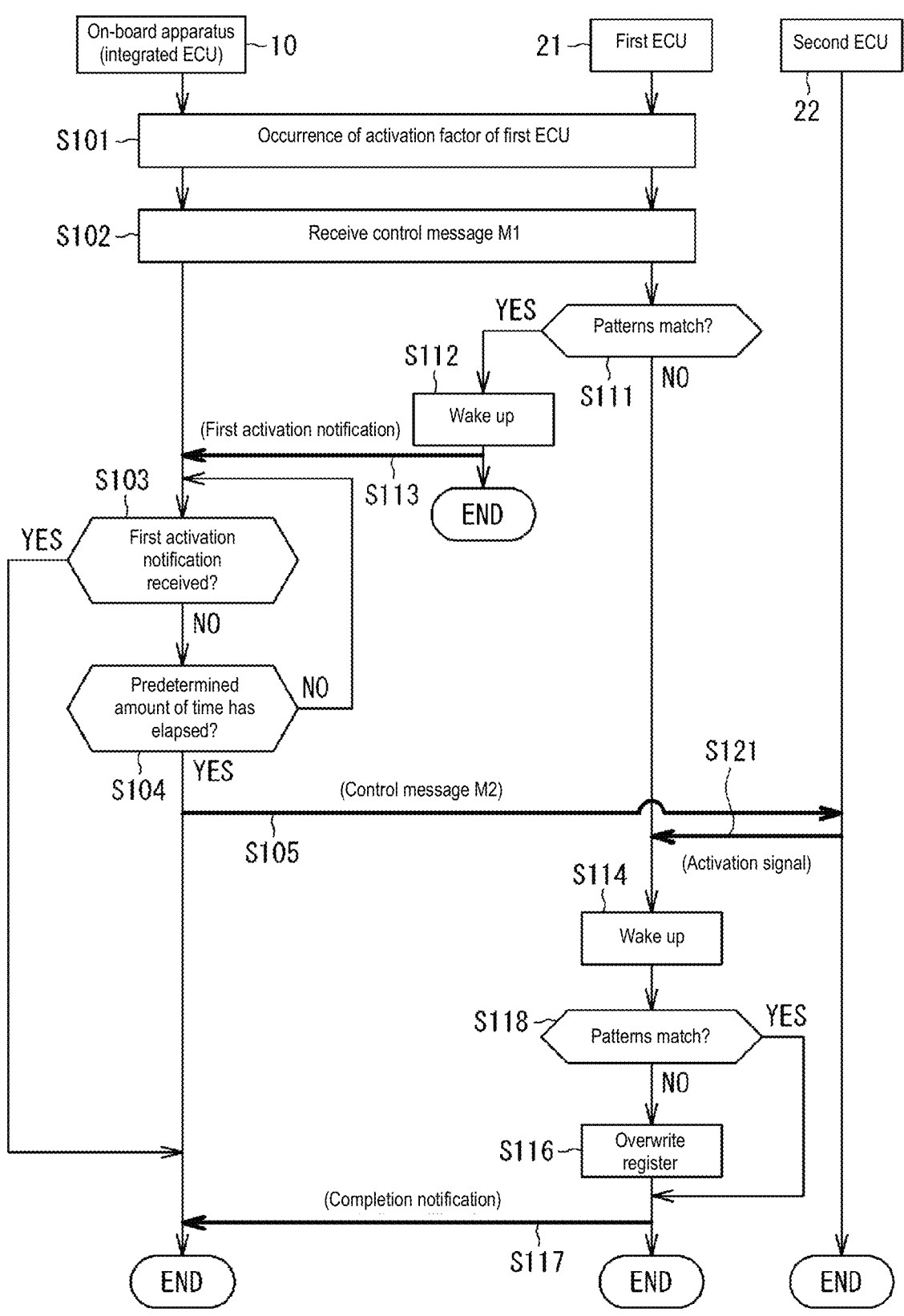
FIG. 5 is a flowchart illustrating a control method according to a modification.

FIG. 5 is a flowchart illustrating a control method according to the modification. In the present modification, the first ECU 21 executes control that is the same as that in the above-described embodiment up to step S114. Furthermore, in the present modification, the on-board apparatus 10 does not execute the control in steps S106 and S107.

In the present modification, the activation signal WS1 includes the wake-up pattern WP1. Upon switching to the normal mode in step S114, the first ECU 21 determines whether or not the wake-up pattern WP1 included in the activation signal WS1 matches the matching pattern MPx in the register 76 (step S118).

If the wake-up pattern WP1 does not match the matching pattern MPx (NO in step S118), the first ECU 21 generates the correct matching pattern MP1 based on the wake-up pattern WP1 according to the same method as that in the above-described embodiment. Furthermore, the first ECU 21 overwrites the matching pattern MPx in the register 76 with the correct matching pattern MP1 (step S116). After overwriting the register 76, the first ECU 21 transmits a completion notification Y3 indicating that the first ECU 21 has switched to the normal mode to the on-board apparatus 10 via the communication bus 31 (step S117), and terminates the sequence of control.

If the wake-up pattern WP1 matches the matching pattern MPx (YES in step S118), the first ECU 21 transmits the completion notification Y3 to the on-board apparatus 10 via the communication bus 31 (step S117) without overwriting the register 76 (i.e., skips step S116), and terminates the sequence of control.

The processing load in the on-board apparatus 10 can be reduced because the determination of whether or not the wake-up pattern WP1 matches the matching pattern MPx and the generation of the correct matching pattern MP1 are executed by the first ECU 21 in such a manner.

Modification of On-Board System

Figure 6:
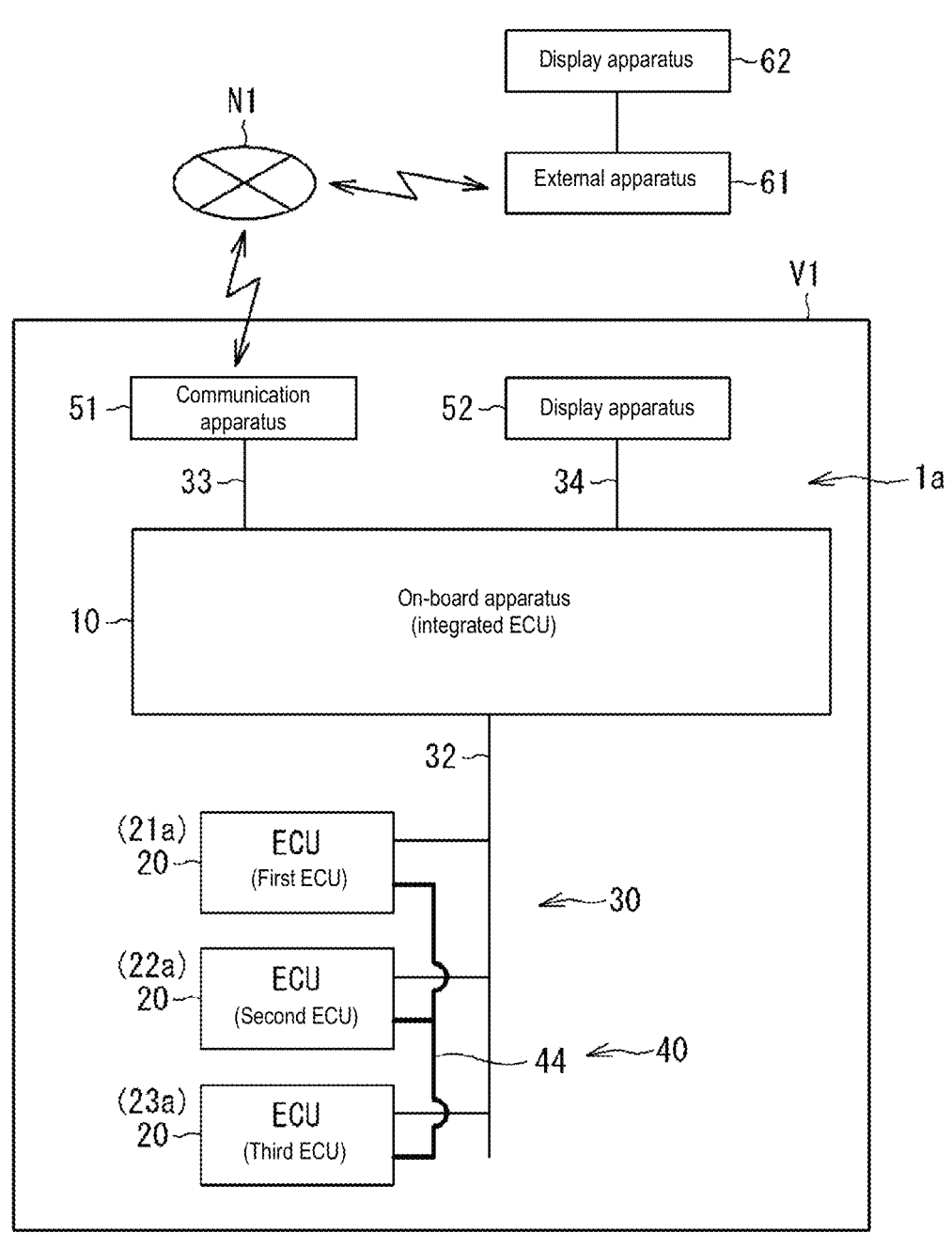
FIG. 6 is a diagram illustrating an on-board system according to a modification.

FIG. 6 is a diagram illustrating an on-board system 1a according to a modification. In the on-board system 1a, a plurality of ECUs 20 are connected to the communication bus 32 extending from the on-board apparatus 10. The plurality of ECUs 20 are referred to as a first ECU 21a, a second ECU 22a, and a third ECU 23a in order from the upper side for distinction.

These ECUs 21a to 23a all support the partial network function. The second ECU 22a is connected to the first ECU 21a via a communication line 44 that is different from the communication bus 30. For example, the communication line 44 is a direct wire.

The communication line 44 branches in the middle thereof, and the second ECU 22a is connected to the first ECU 21a, and is also connected to the third ECU 23a in parallel. Thus, a signal output onto the communication line 44 from the second ECU 22a is input to the first ECU 21a and also input to the third ECU 23a. By using such a communication line 44, the total wire length used for the communication line 40 can be reduced compared to a case in which these ECUs 21a to 23a are connected using separate communication lines, for example.

The second transceivers 73 that are included in the first ECU 21a and the third ECU 23a and connected to the communication line 44 may each be a transistor (e.g., a field-effect transistor (FET)) that detects only the difference between the HIGH and LOW levels of a signal transmitted on the communication line 44.

Figure 7:
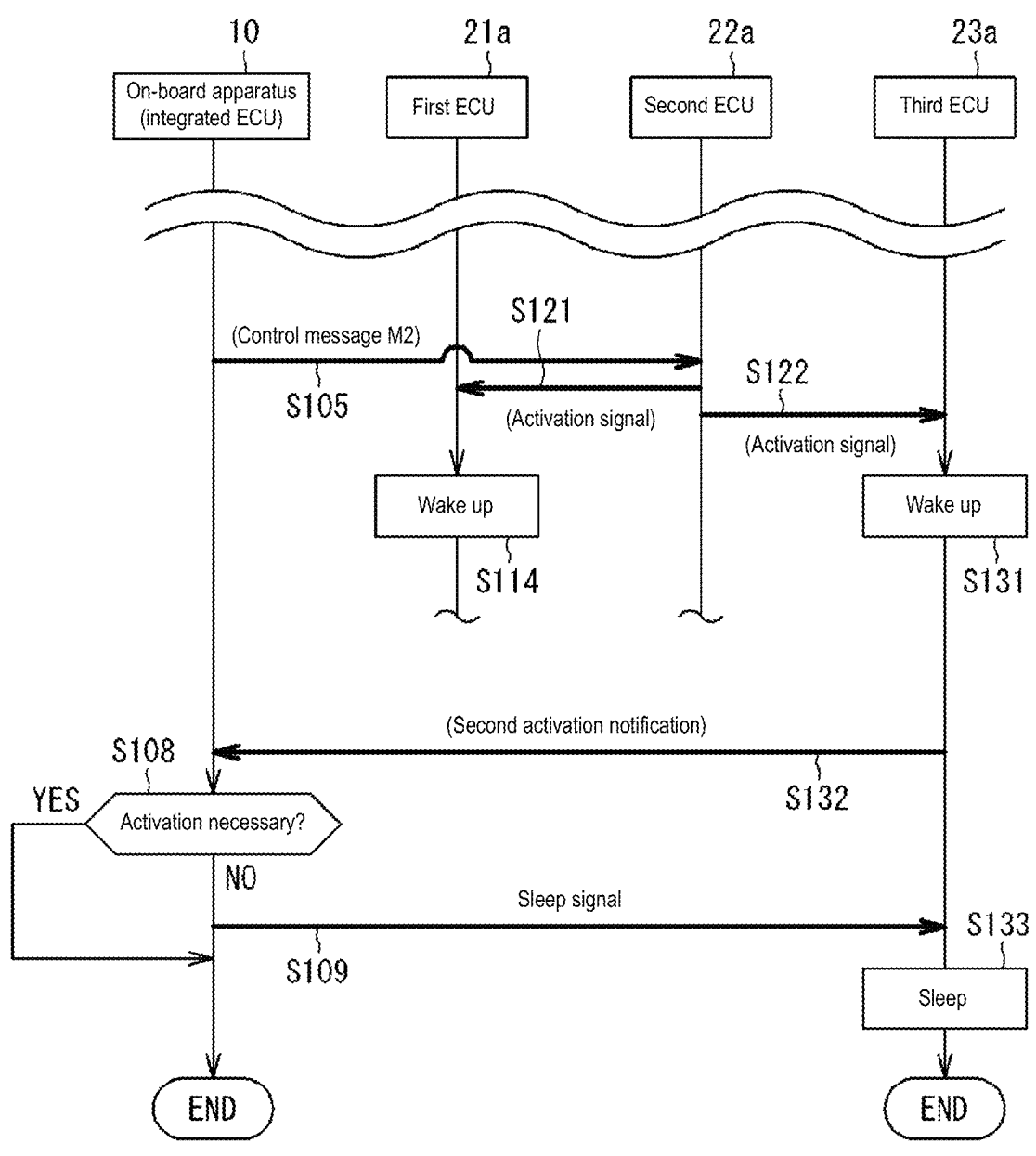
FIG. 7 is a flowchart illustrating a control method according to the modification.

FIG. 7 is a flowchart illustrating a control method according to the modification. In the on-board system 1a, wire length can be reduced because the communication line 44 connecting the first ECU 21a and the third ECU 23a in parallel to the second ECU 22a is used as the communication line 40; on the other hand, this may give rise to a new problem that, even in a case in which it is unnecessary to wake up the third ECU 23a, the third ECU 23a would also be woken up when the activation signal WS1 is transmitted to the first ECU 21a via the second ECU 22a, for example.

In view of this, in the present modification, the third ECU 23a is switched to the sleep mode by transmitting a sleep signal SS1 from the on-board apparatus 10 to the third ECU 23a when the third ECU 23a has been woken up unnecessarily by the activation signal WS1. Thus, an increase in power consumption in the on-board system 1a can be suppressed.

Specific details of control will be described with reference to FIG. 7. In the present modification, the control up to step S105 is executed in the same manner as in the above-described embodiment. In step S105, the on-board apparatus 10 transmits the control message M2 to the second ECU 22a via the communication bus 32. Here, because the first ECU 21a and the third ECU 23a support the partial network function, the first ECU 21a and the third ECU 23a are not woken up by the control message M2, which is transmitted on the communication bus 32 and addressed to the second ECU 22a, and are in the sleep state at the time when step S105 is completed.

The second ECU 22a having received the control message M2 transmits the activation signal WS1 onto the communication line 44. The activation signal WS1 is received by the second transceiver 73 of the first ECU 21a from the communication line 44 (step S121), and the first ECU 21a switches from the sleep mode to the normal mode (step S114).

At this time, the activation signal WS1 is also received by the second transceiver 73 of the third ECU 23a from the communication line 44 (step S122), and the third ECU 23a switches from the sleep mode to the normal mode even though the third ECU 23a does not need to wake up (step S131).

Upon waking up due to receiving the activation signal WS1 via the communication line 44, the third ECU 23a transmits a second activation notification X2 to the on-board apparatus 10 via the communication bus 32 in order to notify the on-board apparatus 10 that the third ECU 23a has been abnormally activated (step S132). For example, the second activation notification X2 includes the address of the third ECU 23a, and information indicating that the third ECU 23a has woken up abnormally without receiving a control message transmitted on the communication bus 32.

Upon receiving the second activation notification X2, the on-board apparatus 10 determines whether or not the third ECU 23a needs to be activated (step S108). Specifically, the on-board apparatus 10 determines whether or not a wake-up pattern corresponding to the third ECU 23a is included in the received control message M1 and other received control messages.

If the wake-up pattern corresponding to the third ECU 23a is included, the on-board apparatus 10 determines that the third ECU 23a needs to be activated (in other words, determines that there is no problem even if the third ECU 23a is in the normal mode) (YES in step S108). In this case, the on-board apparatus 10 skips later-described step S109 and terminates the sequence of control.

If the wake-up pattern corresponding to the third ECU 23a is not included, the on-board apparatus 10 determines that the third ECU 23a does not need to be activated (in other words, determines that the third ECU 23a is in the normal mode abnormally even though it should be in the sleep mode) (NO in step S108). In this case, the on-board apparatus 10 transmits, to the third ECU 23a via the communication bus 32, the sleep signal SS1 for switching the third ECU 23a from the normal mode to the sleep mode (step S109).

Upon receiving the sleep signal SS1, the third ECU 23a switches from the normal mode to the sleep mode (step S133). Thus, power consumption in the on-board system 1a can be suppressed by returning, to the sleep mode, the third ECU 23a having woken up incidentally as a result of the control for waking up the first ECU 21a.

Note that step S108 may be omitted in the above-described control. That is, upon receiving the second activation notification X2, the on-board apparatus 10 may transmit the sleep signal SS1 after determining whether or not the third ECU 23a needs to be activated, or may transmit the sleep signal SS1 without performing the determination.

Addition of ECU

Figure 8:
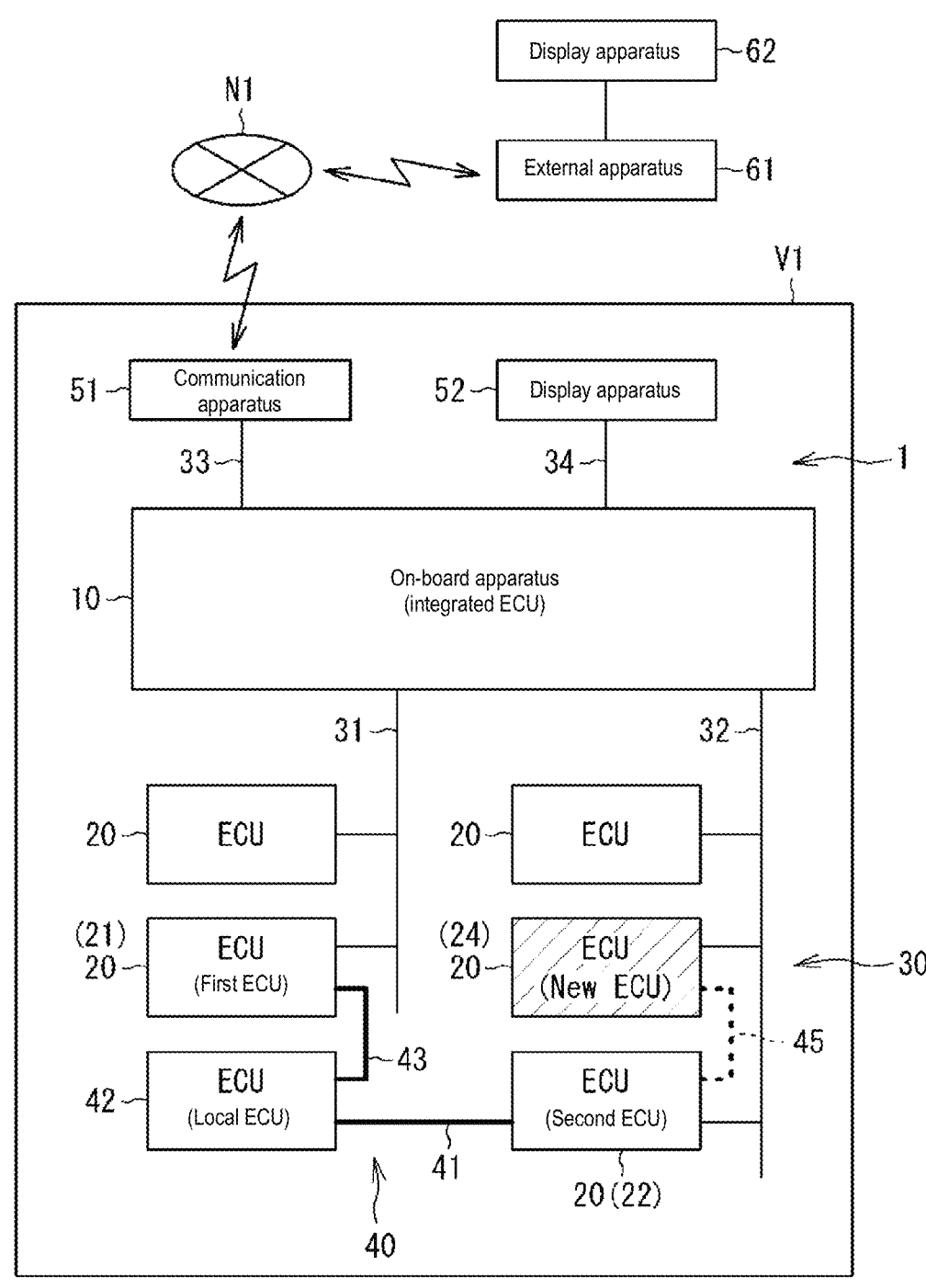
FIG. 8 is a diagram illustrating an on-board system according to a modification.

FIG. 8 is a diagram illustrating an on-board system 1 according to a modification. FIG. 8 illustrates a state in which a new ECU 20 has been added to the communication bus 32 in the on-board system 1 illustrated in FIG. 1. Hereinafter, this new ECU 20 is referred to as an "ECU 24". The ECU 24 is an ECU supporting the partial network function, and includes the first transceiver 72 and the second transceiver 73, as is the case with the first ECU 21.

In regard to an ECU 20 supporting the partial network function, if there is no route connecting the ECU 20 to another ECU 20 via the communication line 40, the on-board system 1 may not operate properly as a result of the ECU 20, which is supposed to wake up, not waking up due to the register 76 being abnormally overwritten as described above. Thus, if a new ECU 20 supporting the partial network function is added in the on-board system 1, it is beneficial for the improvement of reliability of the on-board system 1 that the ECU 20 be connected to the communication bus 30 and also be connected to another ECU 20 via the communication line 40.

However, upon adding the ECU 24 to the communication bus 32 for example, a worker adding the ECU 24 may make a mistake and forget to connect a communication line 45 even though the ECU 24 is supposed to be connected to the second ECU 22 via the communication line 45. In the present modification, the ECU 24 is connected to the second ECU 22 via the communication line 45 with greater certainty by displaying a warning on the display apparatus 52 (or the display apparatus 62) if a human error as described above occurs when the ECU 24 is added.

Figure 9:
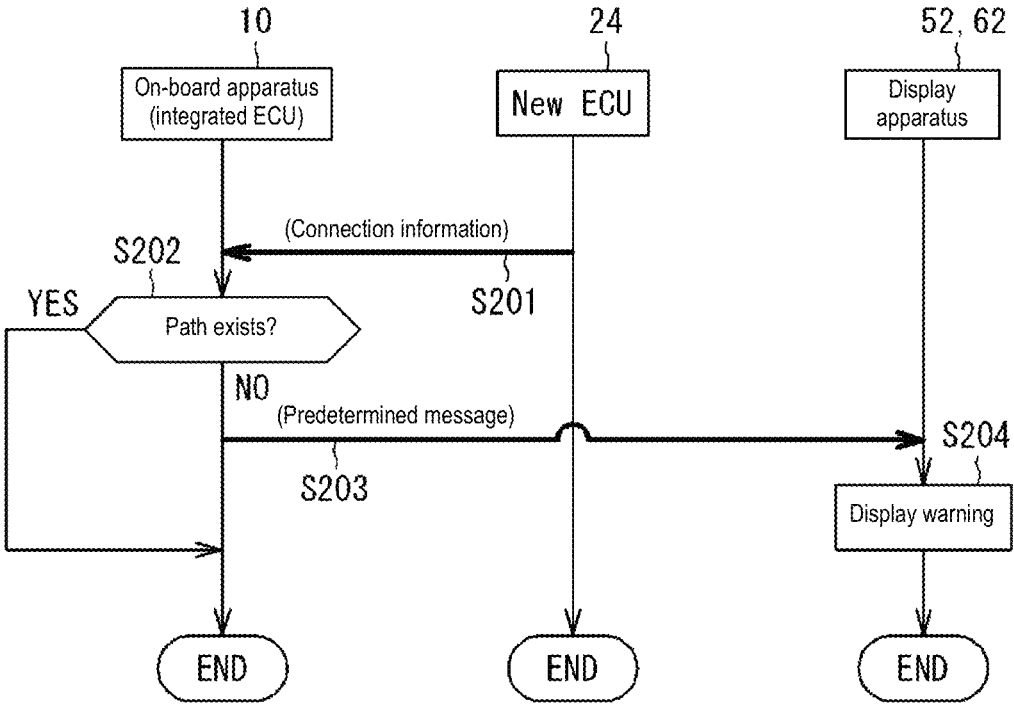
FIG. 9 is a flowchart illustrating a control method according to the modification.

FIG. 9 is a flowchart illustrating a control method according to the modification.

When the ECU 24 is added to the plurality of ECUs 20 and the first transceiver 72 of the ECU 24 is connected to the communication bus 32, the ECU 24 transmits connection information D1 to the on-board apparatus 10 via the communication bus 32 (step S201). For example, the connection information D1 includes the address of the ECU 24.

Upon receiving the connection information D1, the on-board apparatus 10 determines whether or not there is a route in which the ECU 24 and another ECU 20 are connected via the communication line 40 (step S202). Specifically, according to a known method, the on-board apparatus 10 acquires a network topology diagram for all ECUs 20 connected to the communication bus 30 and the communication line 40. Based on the network topology diagram and the address of the ECU 24 included in the connection information D1, the on-board apparatus 10 determines whether or not the ECU 24 is connected to another ECU 20 via the communication line 40.

If the ECU 24 is not connected to any other ECU 20 via the communication line 40 (NO in step S202), the on-board apparatus 10 transmits a predetermined message M3 to the display apparatus 52 via the communication bus 34 (step S203) because the probability is high of the communication line 45 not being connected due to forgetfulness. The predetermined message M3 is a message for notifying a worker or the like of wiring abnormalities, and is also referred to as a warning message, notification message, or error message, for example.

Upon receiving the predetermined message M3, the display apparatus 52 displays a warning that indicates, in regard to the ECU 24, that the communication line 45 has not been connected thereto due to forgetfulness (step S204). For example, text such as "There is a wire that has not been connected regarding the ECU 24" is displayed on the display of the display apparatus 52. The reliability of the on-board system 1 can be improved because the worker having added the ECU 24 can connect the ECU 24 to the communication line 45 correctly by checking the warning that is displayed.

Furthermore, in a case in which the display apparatus 52 is an apparatus, such as an on-board navigation apparatus, that performs display toward the interior of the vehicle V1, even if the vehicle V1 is delivered to a customer without the warning display being noticed by the worker that has added the ECU 24, a person on board the vehicle V1 can notice the warning display. Then, the person on board the vehicle V1 can ask the worker having added the ECU 24 to redo the work, whereby the ECU 24 can be connected correctly to the communication line 45; thus, the reliability of the on-board system 1 can be improved.

Note that the warning may be displayed on the display apparatus 62 in place of the display apparatus 52, or the warning may be displayed on both the display apparatuses 52 and 62. In this case, the on-board apparatus 10 transmits the predetermined message M3 to the display apparatus 62 via the network N1 and the external apparatus 61 in step S203. Then, upon receiving the predetermined message M3, the display apparatus 62 displays the warning indicating that the communication line 45 has not been connected regarding the ECU 24 due to forgetfulness (step S204).

Selection of Route

Figure 10:
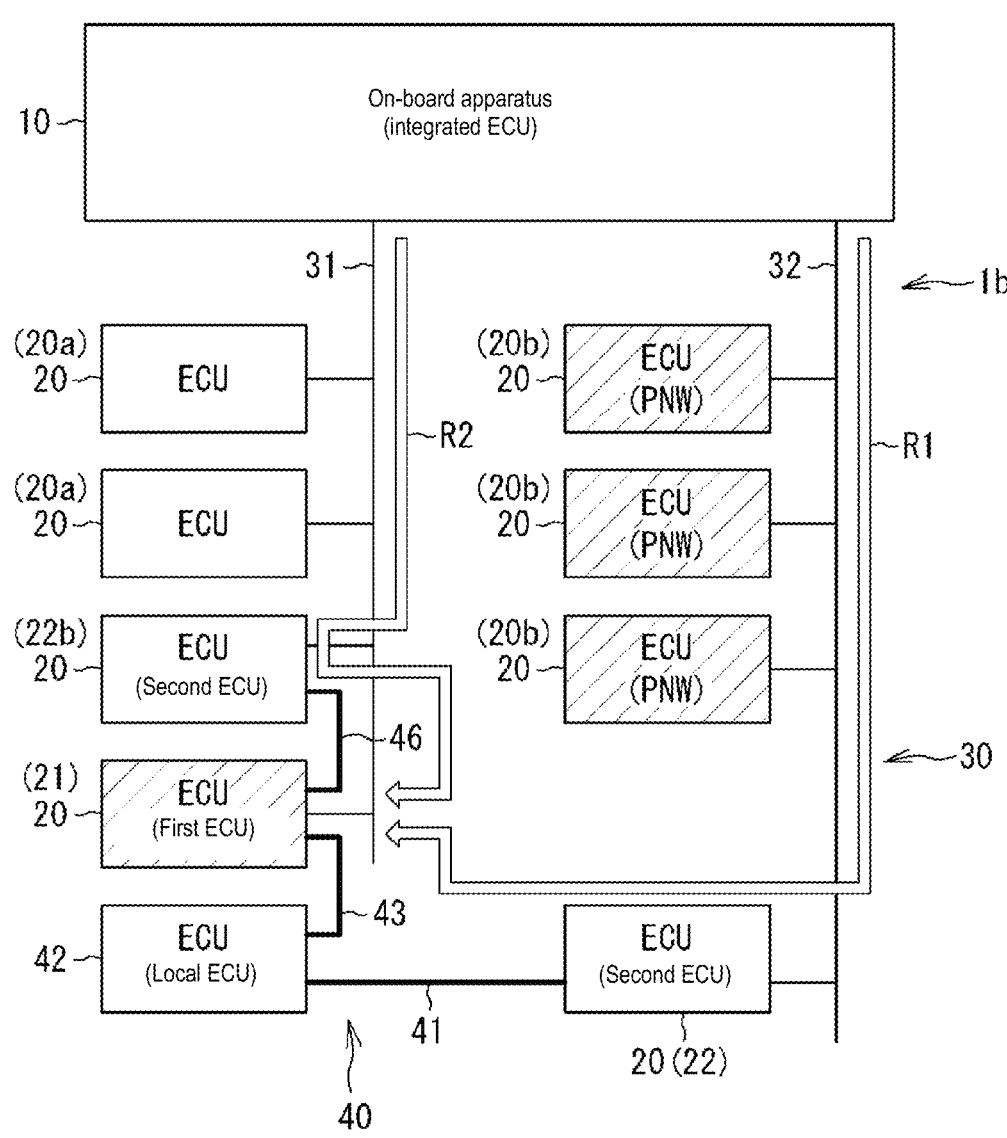
FIG. 10 is a diagram illustrating an on-board system according to a modification.

FIG. 10 is a diagram illustrating an on-board system 1b according to a modification.

In the on-board system 1b, the first ECU 21 is connected by multiple routes to the on-board apparatus 10 via the communication line 40. Specifically, the first ECU 21 is connected by a first route R1 and a second route R2 to the on-board apparatus 10 via the communication line 40.

The first route R1 is the same route as that in the above-described embodiment (FIG. 1), and is a route that connects the on-board apparatus 10 and the first ECU 21 via the second ECU 22, which is connected to the communication bus 32, the first local bus 41, the local ECU 42, and the second local bus 43.

The second route R2 is a route that connects the on-board apparatus 10 and the first ECU 21 via a second ECU 22b, which is connected to the communication bus 31, and a communication line 46. The first ECU 21 illustrated in FIG. 10 includes two second transceivers 73, one of which (e.g., a CAN transceiver) is connected to the second local bus 43, and the other (e.g., an FET) is connected to the communication line 46 (e.g., a direct wire).

In FIG. 10, ECUs 20 supporting the partial network function are illustrated with hatching, and ECUs 20 not supporting the partial network function are illustrated without hatching. Specifically, the bottommost ECU 20 (first ECU 21) among the ECUs 20 connected to the communication bus 31 supports the partial network function, and the two ECUs 20 (these two ECUs 20 are referred to as "ECUs 20a" as needed) that are first and second from the top among the ECUs 20 connected to the communication bus 31 and the second ECU 22b do not support the partial network function. Furthermore, the three ECUs 20 (these three ECUs 20 are referred to as "ECUs 20b" as needed) among the ECUs 20 connected to the communication bus 32 support the partial network function, and the bottommost ECU 20 (second ECU 22) among the ECUs 20 connected to the communication bus 32 does not support the partial network function.

The on-board apparatus 10 (specifically the control unit 12) selects, from among the first route R1 and the second route R2, a route for transmitting the activation signal WS1 to the above-described first ECU 21. In doing so, the on-board apparatus 10 selects the route passing through the least number of ECUs among the multiple routes (the first route R1 and the second route R2). The smaller the number of ECUs 20 that a signal transmitted from the on-board apparatus 10 passes through, the more quickly the signal would arrive at the first ECU 21. Thus, the first ECU 21 can be switched to the normal mode more quickly.

For example, the first route R1 passes through two ECUs, i.e., the second ECU 22 and the local ECU 42, before reaching the first ECU 21 from the on-board apparatus 10. In contrast, the second route R2 passes through only the second ECU 22b (i.e., one ECU) before reaching the first ECU 21 from the on-board apparatus 10. Thus, the on-board apparatus 10 determines the second route R2 as the route for transmitting the activation signal WS1.

Then, as described in the above-described embodiment, the on-board apparatus 10 transmits the control message M2 to the second ECU 22b so as to pass through the second route R2 in the control in step S105, and thereby causes the second ECU 22b to transmit the activation signal WS1 to the first ECU 21 via the communication line 46. Thus, the first ECU 21 can switch to the normal mode more quickly.

Note that the on-board apparatus 10 may select the route for transmitting the activation signal WS1 from among the first route R1 and the second route R2 from a viewpoint other than that described above. For example, if it is desirable to suppress power consumption in the on-board system 1b to a further extent, the on-board apparatus 10 may select, from among the multiple routes, a route in which the number of ECUs that are to be switched to the normal mode by the control message M2, which is broadcast onto the communication bus 30 to transmit the activation signal WS1 to the first ECU 21, is the least.

The ECUs 20b support the partial network function, and thus do not switch to the normal mode even if a control message that is not addressed to itself is received. Thus, in the case of the first route R1, only the second ECU 22 among the multiple ECUs 20 connected to the communication bus 32 switches to the normal mode when the on-board apparatus 10 transmits the control message M2 onto the communication bus 32. Then, the local ECU 42 switches to the normal mode as a result of the control message M2 being transmitted to the local ECU 42 via the first local bus 41. That is, in the case of the first route R1, two ECUs are switched to the normal mode by the control message M2.

In contrast, the ECUs 20a do not support the partial network function, and thus switch to the normal mode when a control message is received, regardless of the destination to which the control message is addressed. Thus, in the case of the second route R2, the two ECUs 20a, as well as the second ECU 22b, switch to the normal mode when the on-board apparatus 10 transmits the control message M2 onto the communication bus 31. That is, in the case of the second route R2, three ECUs are switched to the normal mode by the control message M2.

According to the above, the number of ECUs switching to the normal mode is less in the case of the first route R1. Thus, the on-board apparatus 10 determines the first route R1 as the route for transmitting the activation signal WS1. Then, as described in the above-described embodiment, the on-board apparatus 10 transmits the control message M2 to the second ECU 22 so as to pass through the first route R1 in the control in step S105, and thereby wakes up the first ECU 21. Thus, upon switching the first ECU 21 to the normal mode, power consumption in the on-board system 1b can be reduced because the number of ECUs that are unnecessarily woken upon can be reduced.

Supplement

Note that at least some of the embodiments and various modifications described above may be combined with one another as appropriate. Furthermore, the embodiments and modifications disclosed herein are examples in every way, and shall be construed as being non-limiting. The scope of the present disclosure is indicated by the claims, and is intended to include all modifications that are within the meaning and scope of equivalents of the claims.

The invention claimed is:

1. An on-board system having a plurality of ECUs connected to an on board apparatus via a communication bus, wherein the plurality of ECUs include:

a first ECU; and a second ECU that is connected to the first ECU via a communication line that is different from the communication bus, the first ECU includes:

a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the on-board apparatus comprises:

a storage unit that stores therein a wake-up pattern for switching the first ECU from the sleep mode to the normal mode;

and a control unit that transmits the activation signal to the first ECU via the communication bus, the second ECU, and the communication line in response to a first activation notification indicating that the first ECU has switched to the normal mode is not has not been received within a predetermined amount of time after a control message corresponding to the wake-up pattern is received from the communication bus.

2. The on-board system according to claim 1, wherein the on-board apparatus is connected to a display apparatus via the communication bus or a network, and the control unit transmits a predetermined message to the display apparatus when, in a case in which a new ECU has been added to the plurality of ECUs, the new ECU includes the first transceiver, and there is no route connecting the on-board apparatus and the new ECU via the communication line.

3. The on-board system according to claim 2, wherein the first ECU is connected by multiple routes to the on-board apparatus via the communication line, and the control unit transmits the activation signal to the first ECU using a route, among the multiple routes, that passes through the least number of ECUs.

4. The on-board system according to claim 2, wherein the first ECU is connected by multiple routes to the on-board apparatus via the communication line, and the control unit transmits the activation signal to the first ECU using a route, among the multiple routes, in which the least number of ECUs are to be switched to the normal mode by a predetermined control message that is broadcast on the communication bus in order to transmit the activation signal to the first ECU.

5. The on-board system according to claim 2, wherein the plurality of ECUs further include a third ECU that is connected to the second ECU in parallel with the first ECU via the communication line, the third ECU transmits a second activation notification to the on-board apparatus upon switching from the sleep mode to the normal mode by receiving the activation signal transmitted to the first ECU via the communication line, and upon receiving the second activation notification, the control unit transmits a sleep signal for switching the third ECU from the normal mode to the sleep mode.

6. An on-board system according to claim 2, and the plurality of ECUs including the first ECU and the second ECU.

7. The on-board system according to claim 1, wherein the first ECU is connected by multiple routes to the on-board apparatus via the communication line, and the control unit transmits the activation signal to the first ECU using a route, among the multiple routes, that passes through the least number of ECUs.

8. The on-board system according to claim 1, wherein the first ECU is connected by multiple routes to the on-board apparatus via the communication line, and the control unit transmits the activation signal to the first ECU using a route, among the multiple routes, in which the least number of ECUs are to be switched to the normal mode by a predetermined control message that is broadcast on the communication bus in order to transmit the activation signal to the first ECU.

9. The on-board system according to claim 1, wherein the plurality of ECUs further include a third ECU that is connected to the second ECU in parallel with the first ECU via the communication line, the third ECU transmits a second activation notification to the on-board apparatus upon switching from the sleep mode to the normal mode by receiving the activation signal transmitted to the first ECU via the communication line, and upon receiving the second activation notification, the control unit transmits a sleep signal for switching the third ECU from the normal mode to the sleep mode.

10. An on-board system according to claim 1; wherein the plurality of ECUs includes the first ECU and the second ECU.

11. The on-board system according to claim 10, wherein, when the wake-up pattern does not match the matching pattern in a case in which the first ECU has been switched to the normal mode by the activation signal, the first ECU overwrites the matching pattern recorded in the register with a correct matching pattern matching the wake-up pattern.

12. The on-board system according to claim 11, wherein, upon being switched to the normal mode by the activation signal, the first ECU transmits pattern information including the matching pattern to the on-board apparatus via the communication bus, if the wake-up pattern stored in the storage unit does not match the matching pattern included in the pattern information, the control unit transmits overwrite information including the correct matching pattern to the first ECU, and upon receiving the overwrite information, the first ECU overwrites the matching pattern recorded in the register with the correct matching pattern.

13. The on-board system according to claim 11, wherein the activation signal includes the wake-up pattern, and when the wake-up pattern included in the activation signal does not match the matching pattern recorded in the register in a case in which the first ECU has been switched to the normal mode by the activation signal, the first ECU overwrites the matching pattern recorded in the register with the correct matching pattern.

14. A control method for controlling an on-board apparatus that is connected to a plurality of ECUs via a communication bus, wherein the plurality of ECUs include:

a first ECU; and a second ECU that is connected to the first ECU via a communication line that is different from the communication bus, the first ECU includes:

a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode; and a second transceiver that is a transceiver connected to the communication line, the second transceiver switching the first ECU from the sleep mode to the normal mode upon receiving a predetermined activation signal, and the control method comprises:

a first step of receiving, from the communication bus, a control message corresponding to a wake-up pattern for switching the first ECU from the sleep mode to the normal mode;

a second step of determining whether or not a first activation notification indicating that the first ECU has switched to the normal mode is received within a predetermined amount of time after the first step; and a third step of transmitting the activation signal to the first ECU via the communication bus, the second ECU, and the communication line in response to a determining, after predetermined time has elapsed, that the first activation notification has not been received.

15. A non-transitory computer readable medium storing instruction executed to perform a method for controlling an on-board system having a plurality of ECUs connected to an on board apparatus via a communication bus, wherein the plurality of ECUs include:

a first ECU; and a second ECU that is connected to the first ECU via a communication line that is different from the communication bus, the first ECU includes: a first transceiver that is a transceiver connected to the communication bus, the first transceiver, upon receiving a control message corresponding to a matching pattern recorded in a register of the first transceiver, switching the first ECU to a normal mode from a sleep mode in which functions are limited and power consumption is reduced compared to in the normal mode;

and a second transceiver that is a transceiver connected to the communication line, the second transceiver switching the first ECU from the sleep mode to the normal mode upon receiving a predetermined activation signal, and the method includes:

a first step of receiving, from the communication bus, a control message corresponding to a wake-up pattern for switching the first ECU from the sleep mode to the normal mode; a second step of determining whether or not a first activation notification indicating that the first ECU has switched to the normal mode is received within a predetermined amount of time after the first step; and a third step of transmitting the activation signal to the first ECU via the communication bus, the second ECU, and the communication line if the first activation notification in the second step has not been received within a predetermined amount of time.

* * * * *